United States Patent
Geskes et al.

(10) Patent No.: US 11,655,745 B2
(45) Date of Patent: May 23, 2023

(54) EXHAUST GAS HEAT EXCHANGER

(71) Applicant: Mahle International GmbH, Stuttgart (DE)

(72) Inventors: Peter Geskes, Ostfildern (DE); Harald Müller, Stuttgart (DE); Daniel Schwaderer, Winterbach (DE); Dirk Stadelhofer, Stuttgart (DE)

(73) Assignee: Mahle International GmbH

( * ) Notice: Subject to any disclaimer, the term of this patent is extended or adjusted under 35 U.S.C. 154(b) by 286 days.

(21) Appl. No.: 16/755,559

(22) PCT Filed: Oct. 9, 2018

(86) PCT No.: PCT/EP2018/077488
§ 371 (c)(1),
(2) Date: Apr. 10, 2020

(87) PCT Pub. No.: WO2019/072853
PCT Pub. Date: Apr. 18, 2019

(65) Prior Publication Data
US 2021/0222606 A1    Jul. 22, 2021

(30) Foreign Application Priority Data

Oct. 12, 2017   (DE) .......................... 102017218254.7

(51) Int. Cl.
*F01N 5/02*      (2006.01)
*F28F 27/00*     (2006.01)
(Continued)

(52) U.S. Cl.
CPC ............. *F01N 5/02* (2013.01); *F28D 7/1684* (2013.01); *F28D 21/0003* (2013.01);
(Continued)

(58) Field of Classification Search
CPC ...... F01N 5/02; F01N 2240/02; F28D 7/1684; F28D 21/0003; F28F 9/005; F28F 9/026; F28F 9/22; F28F 27/006
See application file for complete search history.

(56) References Cited

U.S. PATENT DOCUMENTS 8,844,504 B2   9/2014  Raduenz et al.
9,708,944 B2   7/2017  Holdenried et al.
(Continued)

FOREIGN PATENT DOCUMENTS

CN   102213554 A   10/2011
CN   104234877 A   12/2014
(Continued)

OTHER PUBLICATIONS

English abstract for DE-102011006793.
(Continued)

*Primary Examiner* — Audrey B. Walter
(74) *Attorney, Agent, or Firm* — Fishman Stewart PLLC

(57) ABSTRACT

An exhaust gas heat exchanger may include a tube bundle and a housing through which a coolant is flowable. The tube bundle may include a plurality of exhaust gas-conducting tubes held in a first tube base and a second tube base. The housing may enclose the tube bundle and may have face ends delimited by the first tube base and the second tube base. The housing may include a coolant inlet arranged in a region of the second tube base and a coolant outlet arranged in a region of the first tube base such that the coolant flows in counter flow relative to the exhaust gas. A plurality of coolant bypass passages may be arranged between the tube bundle and the housing. At least a subset of the plurality of coolant bypass passages may be at least partly blocked by an inlay structured and arranged to steer a coolant flow.

20 Claims, 3 Drawing Sheets

(51) Int. Cl.
  *F28D 21/00* (2006.01)
  *F28D 7/16* (2006.01)
  *F28F 9/00* (2006.01)
  *F28F 9/22* (2006.01)
  *F28F 9/02* (2006.01)

(52) U.S. Cl.
  CPC .............. *F28F 9/005* (2013.01); *F28F 9/026* (2013.01); *F28F 9/22* (2013.01); *F28F 27/006* (2013.01); *F01N 2240/02* (2013.01)

(56) References Cited

U.S. PATENT DOCUMENTS

| | | | |
|---|---|---|---|
| 9,976,767 B2 | 5/2018 | Roos | |
| 10,180,287 B2 | 1/2019 | Sweet et al. | |
| 2006/0201653 A1* | 9/2006 | Birkert | F28F 9/0236 165/83 |
| 2008/0073059 A1 | 3/2008 | Weel | |
| 2008/0202724 A1* | 8/2008 | Lorenz | F28D 7/0091 165/51 |
| 2014/0373517 A1* | 12/2014 | Sweet | F02M 26/32 60/324 |
| 2015/0107807 A1 | 4/2015 | Hund et al. | |

FOREIGN PATENT DOCUMENTS

| | | | |
|---|---|---|---|
| CN | 105637316 A | 6/2016 | |
| DE | 3815070 C2 | 10/1996 | |
| DE | 102011006793 A1 | 10/2012 | |
| DE | 102014006761 A1 | 12/2014 | |
| DE | 102013221151 A1 | 4/2015 | |
| DE | 102014202447 A1 | 8/2015 | |
| EP | 2372287 A1 | 10/2011 | |
| EP | 2559962 A2 * | 2/2013 | .............. F28F 9/026 |
| EP | 2559962 A2 | 2/2013 | |
| EP | 2957852 | 12/2015 | |
| EP | 2998684 A1 | 3/2016 | |
| GB | 2218195 A | 11/1989 | |
| WO | 2011061090 | 5/2011 | |

OTHER PUBLICATIONS

English abstract for DE-102014202447.
Chinese Office Action dated Jan. 4, 2021 for copending Chinese Application No. 201880063719.6 (with English translation).
English abstract for EP-2559962.

* cited by examiner

EXHAUST GAS HEAT EXCHANGER

CROSS-REFERENCE TO RELATED APPLICATIONS

This application claims priority to International Patent Application No. PCT/EP2018/077488, filed on Oct. 9, 2018, and German Patent Application No. DE 10 2017 218 254.7, filed on Oct. 12, 2017, the contents of both of which are hereby incorporated by reference in their entirety.

TECHNICAL FIELD

The present invention relates to an exhaust gas heat exchanger.

BACKGROUND

In modern internal combustion engines, a part of the combustion exhaust gas is increasingly branched off, mixed with sucked-in fresh air as ballast gas and returned into the combustion chamber, in order to increase the heat capacity of the combustion mixture and thus lower the combustion temperature. For reducing nitrogen oxide emissions, so-called exhaust gas coolers are employed in this connection, which are subjected to high thermal loads by the introduced combustion exhaust gases. During the operation of the internal combustion engine, the latter can reach temperatures of up to 700° C.

Conventional exhaust gas coolers mostly satisfy the operative principle of and exhaust gas heat exchanger, which transfers the heat discharged by the combustion exhaust gas from the combustion chamber to a cooling medium. Since the substance flows as such are separated in the exhaust gas cooler or exhaust gas heat exchanger by a heat-permeable wall, suitable devices are classified in technical circles as indirect exhaust gas heat exchangers, recuperators or heat exchangers.

From EP 2 559 962 A2 an exhaust gas heat exchanger having a tube bundle with exhaust gas-conducting tubes is known, wherein said tube bundle is held in a base each on the inlet and outlet side. Here, the tube bundle is surrounded by a housing flowed through by a coolant, which housing thus surrounds the tube bundle and is delimited at the end side by the two bases. For the coolant inflow and outflow, a coolant inlet and a coolant outlet are provided.

In exhaust gas heat exchangers known from the prior art, a coolant usually flows via a pipe straight into a housing, in which a tube bundle transporting combustion exhaust gases is arranged and which on the end side is limited by two tube bases. The inflowing coolant flows in a predetermined direction into the housing and is distributed in an undefined manner. However, through the undefined distribution of the coolant, regions that are flowed through to a lesser degree can occur, in particular in the region of a tube base, so that the risk of local boiling exists there, as a result of which the lifespan of the exhaust gas heat exchanger is reduced.

SUMMARY

The present invention therefore deals with the problem of stating an improved embodiment for an exhaust gas heat exchanger of the generic type which prevents or at least minimises in particular the risk of a local boiling of coolant.

According to the invention, this problem is solved through the subject matter of the independent claim(s). Advantageous embodiments are subject of the dependent claim(s).

The present invention is based on the general idea of specifically steering a coolant flow to be introduced into an exhaust gas heat exchanger to places at risk of boiling and thereby achieve an optimum cooling in these regions and at the same time at least reduce the risk of the local boiling which increasingly occurs in these regions. The exhaust gas heat exchanger according to the invention comprises a tube bundle with, in particular, parallel exhaust gas-conducting tubes which on the inlet side are held in a first tube base and on the outlet side in a second tube base. Likewise provided is a housing surrounding the tube bundle and flowed through by a coolant, which at the face end is delimited by the two tube bases and comprises a coolant inlet and a coolant outlet. According to the invention, the tube bundles now have a stepped outer circumference and the housing a round cross section, so that between the tube bundle and the housing coolant bypass passages are arranged, through which the coolant could flow directly from the coolant inlet to the coolant outlet. Here, the coolant inlet is situated in the region of the second tube base while the coolant inlet is arranged in the region of the first tube base so that the coolant in the housing flows in counter-flow to the exhaust gas in the tubes, or the flat tubes. In addition, the coolant bypass passages are at least partly blocked by an inlay, which steers a coolant flow specifically in the direction of the first tube base and via the same and because of this cools the same and reduces the risk of a local boiling in particular there. Thus, the inlay assumes the function of a coolant guide within the exhaust gas heat exchanger and because of this makes possible not only a best-possible cooling of the first tube base, in particular of regions of the first tube base at risk of boiling, but makes possible at the same time also an improved flow through intermediate spaces between the individual tubes in the tube bundle, as a result of which the heat transfer and the performance of the exhaust gas heat exchanger as a whole can be increased. This specific guiding of the coolant flow is achieved for example in that the inlay in its shape is adapted to an outer circumference of the tubes, so that between the tubes and the inlay a coolant passage is created, whose cross section substantially corresponds to the cross section of a coolant passage between two adjacent tubes. A distance between the outer tubes and the inlay thus preferably corresponds to the distance between two adjoining tubes. At the two longitudinal ends of the inlay, a stepped shape of a metal part of the inlay merges into a semi-round shape, which can be formed for example as a collar designed complementarily to the inner circumference of the housing, so that the inlay via this collar can be joined with the housing. The transitions between the stepped shape of the middle part and the collar have sloping surfaces which do not or almost not obstruct the coolant flow and because of this do not generate any or hardly any loss of pressure. The inlay according to the invention is arranged adjacent to the first tube base and joined there with an inside of the housing. Through the concept of the round tube-like housing according to the invention with the tube bundle and inlay arranged therein as well as an interconnection of the exhaust gas heat exchanger in counter flow, a best possible cooling of the tubes and above all of the gas inlet base, i.e. of the first tube base is achieved, as a result of which the boiling risk of the exhaust gas heat exchanger can be significantly lowered. This implies that thus less coolant is needed to avoid the boiling as a result of which a performance of a coolant pump and ultimately a fuel consumption of a motor vehicle can be lowered.

Through the improved cooling of the first base, the thermal fatigue strength of the exhaust gas heat exchanger according to the invention compared with conventional systems is increased, wherein at the same time cost-intensive design elements such as for example cast ring passages or other additional components can be done without. In contrast with conventional parallel-flow exhaust gas heat exchangers, a geometry of the coolant inlet or of the coolant outlet, i.e. of the coolant inlet or coolant outlet connectors arranged there can be free selected provided a defined opening cross section is not undershot. In particular, elaborate designs with integrated guiding elements for the coolant conduction can be omitted and cost-effective standard components, such as for example round plate connectors, utilised.

In an advantageous further development of the solution according to the invention, the inlay is welded, soldered or screwed to the housing. Even this non-conclusive enumeration shows the manifold embodiments of the inlay or of a connection of the same to the housing that are possible. Obviously, a crimping or gluing would theoretically be also conceivable.

In a further advantageous embodiment of the solution according to the invention, an axial length of the inlay amounts to at least 33% of the axial length of the tubes, as a result of which it can be ensured that a sufficient amount of coolant is steered into the tube bundle and thus between the individual tubes where it can cool the same. For in the case of short or narrow inlays there would be the risk that insufficient coolant would flow between the actual tubes and too much coolant through the coolant bypass passages, as a result of which under certain circumstances a boiling of the coolant in the region of the tubes could occur. For this reason, the length of the inlay according to the invention is selected so that it reaches up to the position of the tube bundle, in which a wall temperature of the heat-transferring or exhaust gas-conducting tubes is no longer boiling-critical, i.e. is below a boiling temperature of the coolant. Through the shape or configuration of the inlay it can be specifically defined how much coolant is to flow through the tube bundle, i.e. between the individual tubes, and how much coolant is to flow through the respective coolant bypass passages between the tubes and the housing. A particularly optimised flow conduction of the coolant both between the individual tubes and also in the region of the first base and of the coolant bypass passages can be achieved by an axial length of the inlay which amounts to approximately a third of the length of the tubes.

In an advantageous further development of the solution according to the invention, the inlay on the first tube base blocks the coolant bypass passages arranged in the region of the coolant outlet connector and opens the coolant bypass passages located opposite, as a result of which the first tube base is overflowed transversely to the exhaust gas flow with coolant, in particular evenly overflowed, as a result of which in particular places at risk of boiling in the region of the first tube base can be significantly better cooled. By way of this, a boiling risk of the exhaust gas heat exchanger according to the invention can also be clearly lowered, which implies that less coolant is needed in order to avoid boiling and by way of which in turn a performance of a coolant pump and ultimately a fuel consumption of the motor vehicle can be lowered. In addition, the thermal fatigue strength can be increased through the improved cooling of the first base.

In an advantageous further development of the solution according to the invention, the inlay is produced from a deep-drawn sheet with a wall thickness $d_1$ of 0.3 mm smaller $d_1<0.8$ mm. Obviously, alternatives of plastic, in particular as injection moulding, or other materials, such as for example metal castings, are also conceivable wherein in particular a version with the deep-drawn sheet constitutes a particularly preferred embodiment.

In a further advantageous embodiment, the housing is produced from sheet metal with a wall thickness $d_G$ of 1.0 mm$<d_G<$1.5 mm. This comparatively thin wall thickness and thus also the low weight of the exhaust gas heat exchanger is made possible through the cylindrical housing according to the invention, which is extremely pressure-stable and wherein the housing through moulding-in or welding of strip material cannot only be produced extremely economically but also in a wide range of lengths to be flexibly chosen. The cylindrical shape of the housing is particularly favourable in terms of the pressure stability, in particular compared with rectangular or polygonal housing cross sections, wherein additional stiffening beads or similar increasing the strength are not required.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

There it shows, in each case schematically

DETAILED DESCRIPTION

Figure 1:
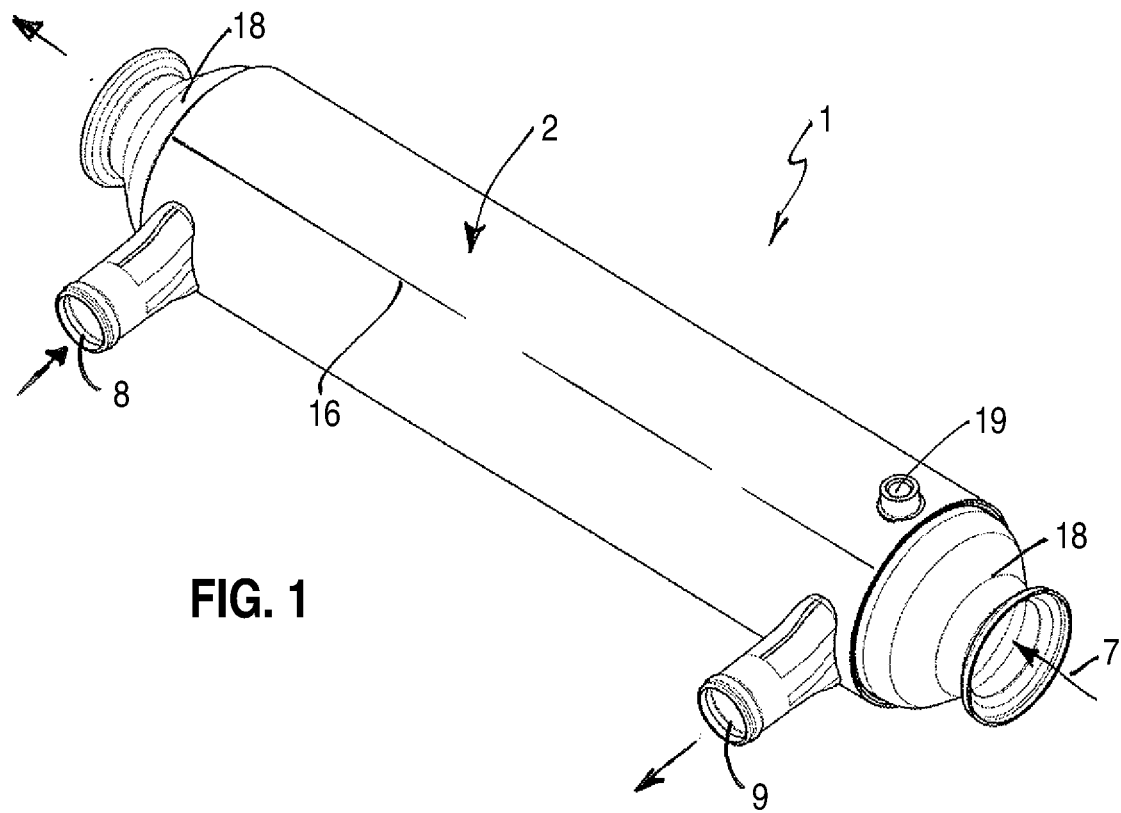
FIG. 1 shows a view of an exhaust gas heat exchanger according to the invention.
Figure 2:
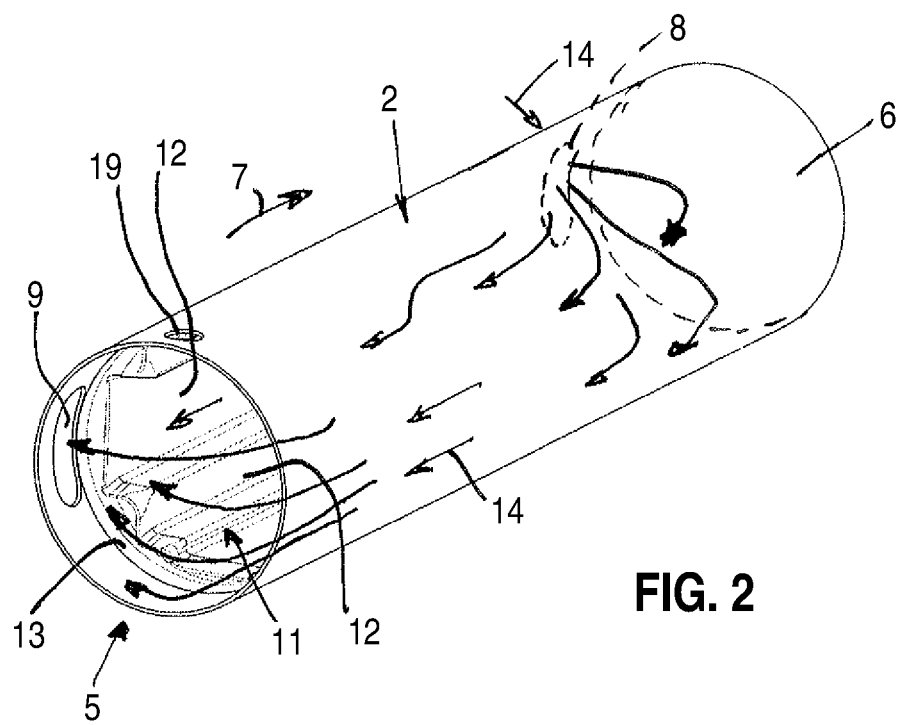
FIG. 2 shows a view of an open housing of the exhaust gas heat exchanger.
Figure 3:
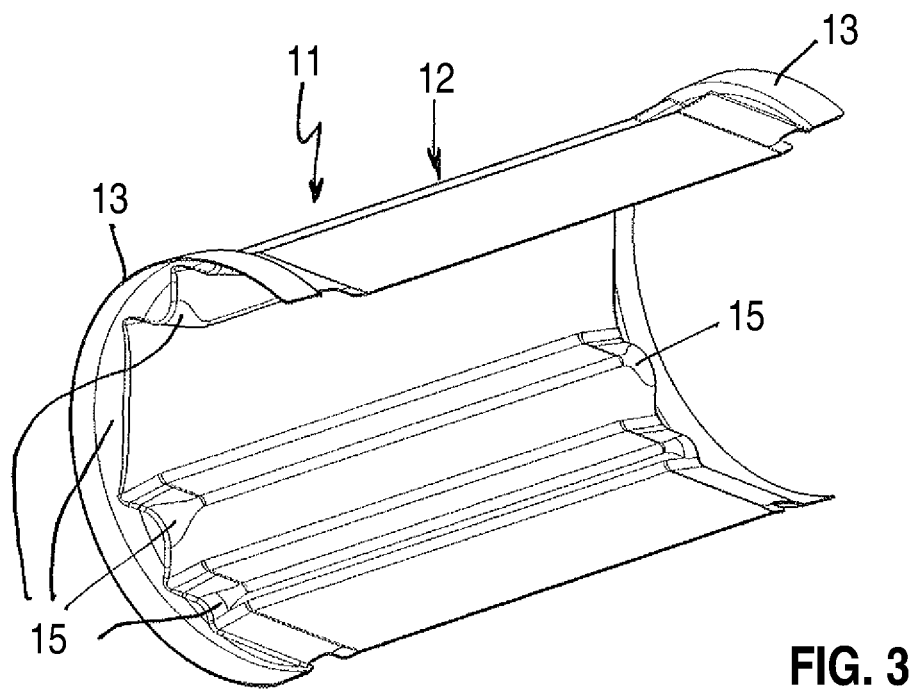
FIGS. 3 and 4 show an inlay each for insertion in the housing from different views.
Figure 4:
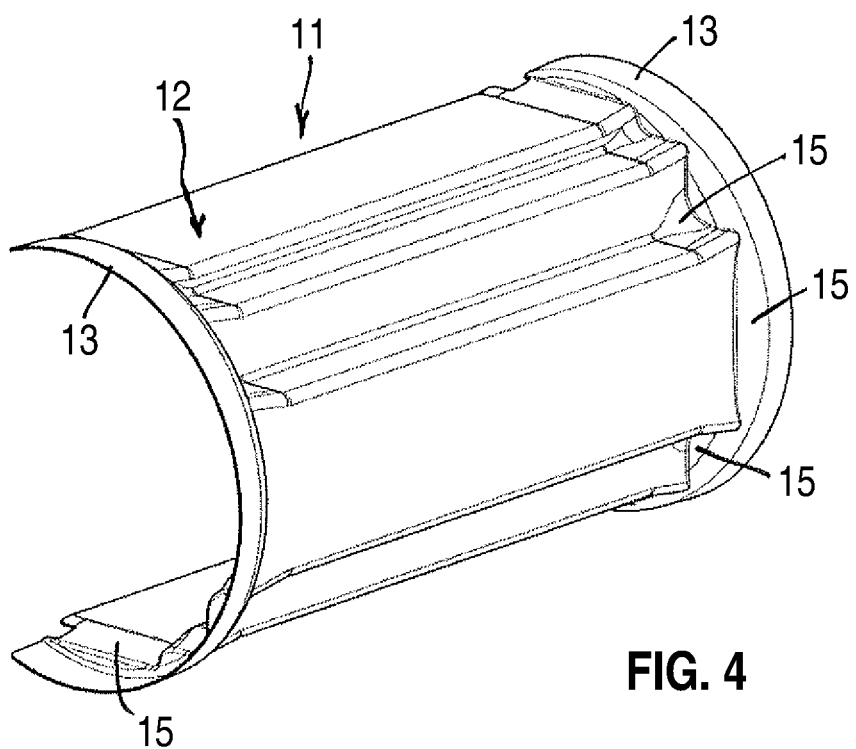
Figure 5:
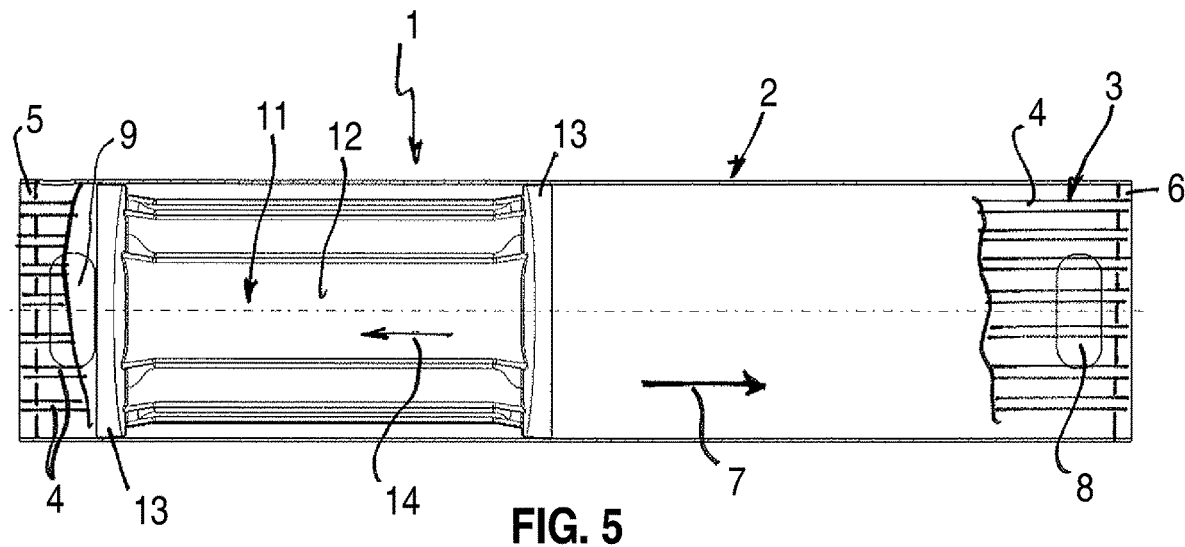
FIG. 5 shows a longitudinal sectional representation through the exhaust gas heat exchanger according to the invention.

According to FIG. 1, an exhaust gas heat exchanger 1 according to the invention comprises a housing 2 (see also FIGS. 2 and 5 and 6), in which a tube bundle with exhaust gas-conducting tubes 4 (see FIG. 6) is arranged. The tubes 4 are held on the inlet side in a first tube base 5 (see FIG. 5) and on the outlet side in a second tube base 6. Within the tubes 4, exhaust gas flows in the direction 6. The housing, which encloses the tube bundle 3 and is delimited at the face end by the two tube bases 5, 6, additionally comprises a coolant inlet 8 and a coolant outlet 9. According to the invention, the tube bundle 3 now has a stepped outer circumference, as is evident for example from FIG. 6, and the housing 2 has a round cross section, so that between the tube bundle 3 and the housing 2 coolant bypass passages 10 are arranged. The coolant inlet 8 is arranged in the region of the second tube base 6 while the coolant outlet 9 is arranged in the region of the first tube base 5 (see also FIG. 5), so that the coolant in the housing 2 flows in counter flow relative to the exhaust gas flow 7 in the tubes 4. The coolant bypass passages 10 are at least partly blocked by an inlay 11, which specifically steers a coolant flow 14 in the direction of the first tube base 5 and there in particular in the direction of regions at risk of boiling.

Figure 6:
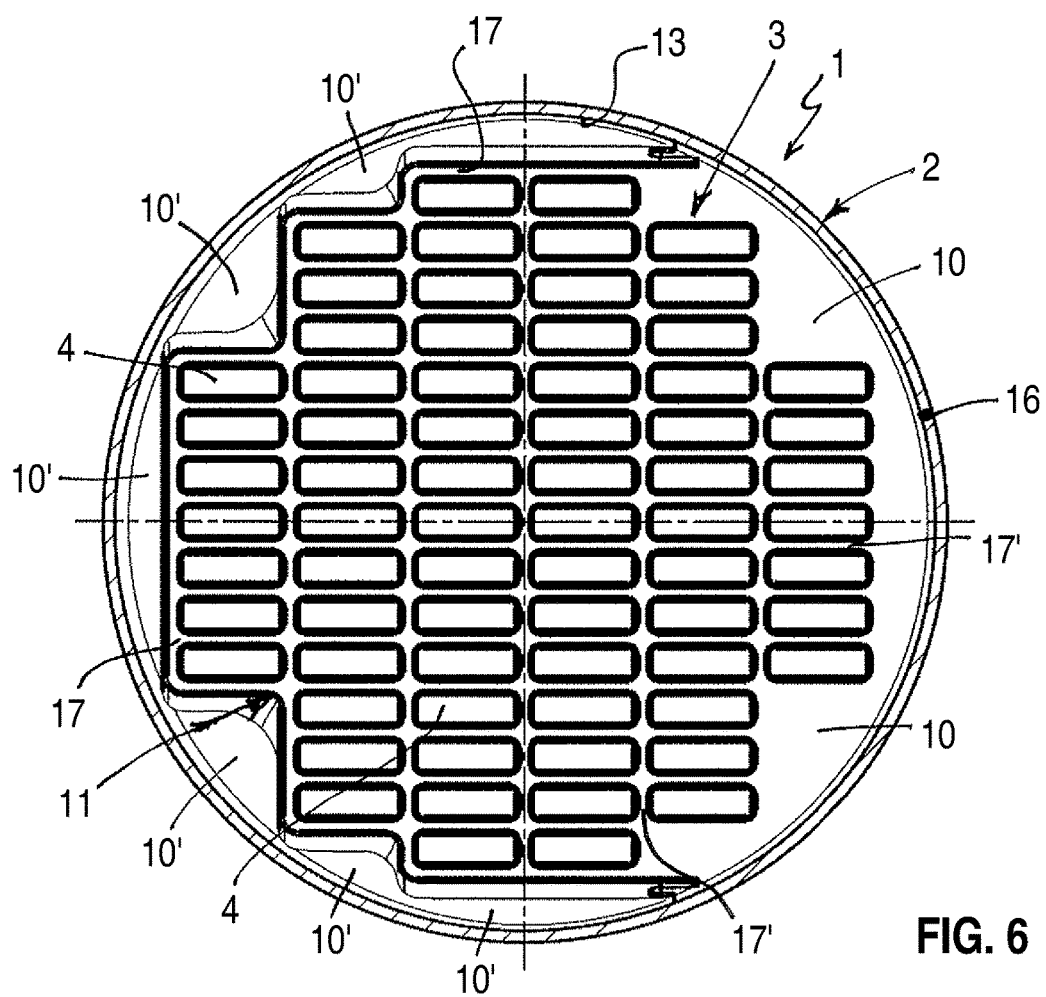
FIG. 6 shows a cross-sectional representation through the exhaust gas heat exchanger according to the invention in the region of the inlay.

In FIG. 6, the coolant bypass passages blocked by the inlay 11 are marked with the reference number 10'. In addition, the inlay 11 is designed in such a manner that it specifically steers the coolant flow 14 between the tubes 4 of the tube bundle 3 and because of this also makes possible a particularly effective cooling of the tubes 4 and thus an effective heat exchange. This is achieved in that the inlay 11, as shown according to the FIGS. 2 to 5, has a C-shaped cross section with a middle part 12 and collars 13 arranged thereon on the longitudinal end side and designed complementarily to the inner circumference of the housing 2, via which collars 13 the inlay 11 lies flat against the housing 2 or can be areally connected, for example glued, welded, soldered, crimped or screwed to the same. The middle part 12 has a shape that is formed complementarily to the outer circumference of the tube bundle 3, as is evident from FIG. 6, so that the middle part 12 of the inlay 11 in this region surrounds the tube bundle 3 in a positively locked manner. According to FIG. 2, the coolant initially flows via the coolant inlet 8 into the housing 2 where it is deflected in the region of the second base 6 and then flows through the intermediate spaces in the tube bundle 3 between the individual tubes 4 and simultaneously also the coolant bypass passages 10. After approximately ⅔ thirds of the length of the tubes 4, the coolant flow 14 strikes the inlay 11, which with its collar 13 blocks the coolant bypass passages 10' there and subsequently guides the coolant flow 14 merely via the coolant bypass passages 10 on the side of the housing 2 located opposite the coolant inlet 8 and the coolant outlet 9 and through the individual passages between the individual tubes 4. By way of this the coolant flow 14 in the region of the still open coolant bypass passages 10 is stronger and, on reaching the first tube base 5, forced to flow along the same transversely to the direction 7 towards the coolant outlet 9, as a result of which in particular a region on the first tube base 5 in particular at risk of boiling, coolant overflows particularly favourably on a location of the housing 2 located opposite the coolant outlet 9 and because of this is protected against boiling. Because of this, the temperature fatigue strength of the exhaust gas heat exchanger 1 according to the invention can be significantly increased in particular.

The inlay 11 itself has bevels 15 at the transition between the respective collar 13 and the middle part 12, which do not or only insignificantly obstruct the coolant flow and because of this do not generate any or only a minor pressure loss.

The inlay 11 according to the invention can be produced for example as a deep-drawn sheet metal part with a wall thickness $d_1$ of 0.3 mm<$d_1$<0.8 mm or alternatively also as a plastic injection moulding or as a metallic casting. By way of this, a comparatively cost-effective yet high-quality production is possible. The housing 2 itself can be produced as a shaped and longitudinally welded sheet metal part having a wall thickness of $d_G$ of 1.0 mm<$d_G$<1.5 mm, wherein the comparatively thin wall thickness is made possible because of the pressure-stable housing 2. Through the shaped housing 2 welded along a weld seam 16 (see FIG. 6), housings 2 of different lengths can be comparatively easily and flexibly produced. Tubes 4 are preferentially designed as flat tubes and can additionally have contours increasing the heat exchange, such as for example winglets, fins or turbulence inlays.

Viewing FIG. 6 again it can be seen that a passage 17 between the inlay 11 and the adjacent tubes 4 is identical in size to a passage 17' between the individual tubes, as a result of which a particularly even flow can be ensured.

With the exhaust gas heat exchanger 1 according to the invention, a boiling of coolant in the region of the first tube base 5 can thus be comparatively easily and effectively prevented, as a result of which the thermal fatigue strength and thus also the performance of the exhaust gas heat exchanger 1 according to the invention can be increased. The openings in the coolant inlet 8 and in the coolant outlet 9 can be introduced for example by way of a simple laser cutting method. Because of the cylindrical shape of the housing 2, cost-effective diffusers 18 (see FIG. 1) can be additionally inserted, which can be designed in particular as identical parts. In FIG. 1, a ventilation opening 19 is additionally shown. In particular, stiffening elements such as for example clamps that were necessary up to now can be dispensed with in particular because of the pressure-stable cylindrical housing 2.

The invention claimed is:

1. An exhaust gas heat exchanger, comprising:
   a tube bundle including a plurality of parallel exhaust gas-conducting tubes, which on an inlet side are held in a first tube base and on an outlet side are held in a second tube base;
   a housing through which a coolant is flowable, the housing enclosing the tube bundle and having face ends delimited by the first tube base and the second tube base, the housing including a coolant inlet and a coolant outlet;
   the tube bundle having a stepped outer circumference and the housing having a round cross section such that between the tube bundle and the housing a plurality of coolant bypass passages are arranged;
   the coolant inlet arranged in a region of the second tube base and the coolant outlet arranged in a region of the first tube base such that the coolant in the housing flows in counter flow relative to the exhaust gas in the plurality of tubes;
   wherein at least a subset of the plurality of coolant bypass passages are at least partly blocked by an inlay structured and arranged to steer a coolant flow in a direction of the first tube base and between the plurality of tubes to cool the plurality of tubes; and
   wherein the inlay has a C-shaped cross section.

2. The exhaust gas heat exchanger according to claim 1, wherein the inlay is at least one of welded, soldered, and screwed to the housing.

3. The exhaust gas heat exchanger according to claim 1, wherein one of:
   the inlay is a deep-drawn sheet metal inlay having a wall thickness of 0.3 mm to 0.8 mm;
   the inlay is a metallic casted inlay; and
   the inlay is a plastic injection moulded inlay.

4. The exhaust gas heat exchanger according to claim 1, wherein an axial length of the inlay amounts to at least 33% of an axial length of the plurality of tubes.

5. The exhaust gas heat exchanger according to claim 1, wherein the inlay is arranged such that:
   the subset of coolant bypass passages at least partially blocked by the inlay are arranged in a region of the coolant outlet;

at least a second subset of coolant bypass passages of the plurality of coolant bypass passages disposed opposite the subset of coolant bypass passages are open; and the first tube base is overflowed by the coolant transversely to an exhaust gas flow direction.

6. The exhaust gas heat exchanger according to claim 1, wherein the housing is a sheet metal housing having a wall thickness of 1.0 mm to 1.5 mm.

7. The exhaust gas heat exchanger according to claim 1, wherein:
the inlay surrounds the tube bundle in a positively locked manner; and
a distance between the inlay and the tube bundle corresponds to a distance between two tubes of the plurality of tubes of the tube bundle.

8. The exhaust gas heat exchanger according to claim 1, wherein the plurality of tubes are structured as a plurality of flat tubes.

9. The exhaust gas heat exchanger according to claim 1, wherein the inlay is disposed in the housing such that a distance between the inlay and the second tube base is equal to ⅔ of an axial length of the plurality of tubes.

10. The exhaust gas heat exchanger according to claim 1, wherein the inlay includes a middle part and two collars arranged on a longitudinal end side.

11. The exhaust gas heat exchanger according to claim 10, wherein:
the two collars of the inlay are structured complementarily to an inner circumference of the housing; and
the inlay lies flat against the housing via the two collars.

12. The exhaust gas heat exchanger according to claim 1, wherein the inlay includes a middle portion and two collars, the two collars disposed on opposing longitudinal ends of the middle portion.

13. The exhaust gas heat exchanger according to claim 12, wherein the inlay includes a plurality of bevels projecting from the middle portion.

14. The exhaust gas heat exchanger according to claim 13, wherein the plurality of bevels protrude from the middle portion toward the tube bundle and extend along the middle portion from one of the two collars to the other of the two collars.

15. The exhaust gas heat exchanger according to claim 14, wherein the plurality of bevels are structured and arranged in a complimentary manner to at least a portion of the stepped outer circumference of the tube bundle such that the inlay engages the tube bundle in a positively locked manner via the plurality of bevels.

16. An exhaust gas heat exchanger, comprising:
a cylindrical housing through which a coolant is flowable, the housing including a coolant inlet and a coolant outlet;
a first tube base disposed in a region of the coolant outlet and delimiting a first face end of the housing;
a second tube base disposed in a region of the coolant inlet and delimiting a second face end of the housing;
a tube bundle including a plurality of parallel exhaust gas-conducting tubes disposed within the housing, an inlet side of the plurality of tubes coupled to the first tube base and an outlet side of the plurality of tubes coupled to the second tube base such that the coolant and the exhaust gas flow through the housing in opposite directions;
the tube bundle having a stepped outer circumference such that a plurality of coolant bypass passages are defined between the tube bundle and the housing;
an inlay structured and arranged to at least partly block at least a subset of the plurality of coolant bypass passages such that a coolant flow is directed toward the first tube base and between the plurality of tubes; and
wherein the inlay has a C-shaped cross section.

17. The exhaust gas heat exchanger according to claim 16, further comprising two diffusers connected to opposing longitudinal ends of the housing, wherein at least a portion of each of the two diffusers is disposed within the housing.

18. The exhaust gas heat exchanger according to claim 16, wherein the inlay includes a middle portion and two collars, the two collars disposed on opposing longitudinal ends of the middle portion.

19. The exhaust gas heat exchanger according to claim 18, wherein the inlay further includes a plurality of bevels that protrude from the middle portion toward the tube bundle and extend along the middle portion from one of the two collars to the other of the two collars.

20. An exhaust gas heat exchanger, comprising:
a housing through which a coolant is flowable, the housing including a coolant inlet and a coolant outlet;
a first tube base disposed in a region of the coolant outlet and delimiting a first face end of the housing;
a second tube base disposed in a region of the coolant inlet and delimiting a second face end of the housing;
a tube bundle including a plurality of parallel exhaust gas-conducting tubes disposed within the housing, an inlet side of the plurality of tubes coupled to the first tube base and an outlet side of the plurality of tubes coupled to the second tube base such that the coolant and the exhaust gas flow through the housing in opposite directions;
the tube bundle having a stepped outer circumference such that a plurality of coolant bypass passages are defined between the tube bundle and the housing;
an inlay structured and arranged to at least partly block at least a subset of the plurality of coolant bypass passages such that a coolant flow is directed toward the first tube base and between the plurality of tubes;
wherein the plurality of tubes are structured as a plurality of rectangular tubes and are disposed spaced apart from one another; and
wherein a distance between the inlay and the tube bundle is equal to a distance between each of the plurality of tubes.

* * * * *